United States Patent
Tallam

[19]

[11] Patent Number: 6,160,501
[45] Date of Patent: Dec. 12, 2000

[54] STORING PACKET DATA

[75] Inventor: Madhukar Tallam, Fremont, Calif.

[73] Assignee: Intel Corporation, Santa Clara, Calif.

[21] Appl. No.: 09/309,463

[22] Filed: May 11, 1999

[51] Int. Cl.[7] .................................................. H03M 7/00
[52] U.S. Cl. ........................ 341/60; 711/163; 386/112; 380/4
[58] Field of Search .................... 380/3–5; 711/113, 711/152, 163; 386/95, 104, 112, 111, 125; 341/60

[56] References Cited

U.S. PATENT DOCUMENTS

| | | | |
|---|---|---|---|
| 5,251,308 | 10/1993 | Frank et al. ............................. | 395/425 |
| 5,933,394 | 8/1999 | Kim ........................................... | 369/32 |
| 5,964,835 | 10/1999 | Fowler et al. ............................ | 709/216 |
| 5,987,214 | 11/1999 | Iwamura ................................... | 386/95 |
| 5,991,503 | 11/1999 | Miyasaka et al. ....................... | 386/111 |

*Primary Examiner*—Michael Tokar
*Assistant Examiner*—Don Phu Le
*Attorney, Agent, or Firm*—Trop, Pruner & Hu, P.C.

[57] ABSTRACT

A system for storing and replaying packet information involves storing at least a portion of a header in a different memory location than the sample data. A linked list may be developed to link the headers and to link the headers to the sample data. After replaying the stored information a predetermined time or times, the header may be destroyed, thereby preventing the replay of the received information.

30 Claims, 3 Drawing Sheets

STORING PACKET DATA

BACKGROUND

This invention relates generally to storing packet data and in some embodiments to storing data such as video and audio files which have been transmitted over a transport medium.

A variety of audio and video content is provided to content consumers using a variety of transport media including airwave broadcasts, network transmissions, satellite transmissions and cable transmissions, as examples. Content producers have concerns that their property rights in such content will not be respected when high quality digital recording techniques are widely available to consumers. For example, the recording industry is concerned about the on-line recording of music and similarly content owners have concerns about the recording of broadcast television content.

With a digital recording medium it is possible to make very high quality recordings of content provided at low cost. These recordings may be duplicated using widely available equipment to make a large number of copies at very low cost.

Thus, there is a continuing need for techniques for protecting the rights of content owners while providing consumers with access to advanced recording technologies.

SUMMARY

In accordance with one aspect, a method of storing packet information including a header and sample data includes receiving at least a portion of the sample header and at least a portion of the sample data, with the header parsed from said sample data. The header and the data portions are stored in different memory locations.

DETAILED DESCRIPTION

A content provider may provide content including either video or audio information or both over a suitable transport medium for recording and playing at a receiving site. Potential transport media that may be utilized in connection with the present invention include airwave broadcasts, satellite transmissions, cable transmissions and network transmissions, such as Internet transmissions, as examples.

The receiving site may be in the form of a processor-based system such as a desktop computer, a mobile computer, a set top computer system, an appliance, or a game device, as examples. The processor-based system may be coupled to the transport medium to receive content and to store that content for replay by the system user.

Figure 3:
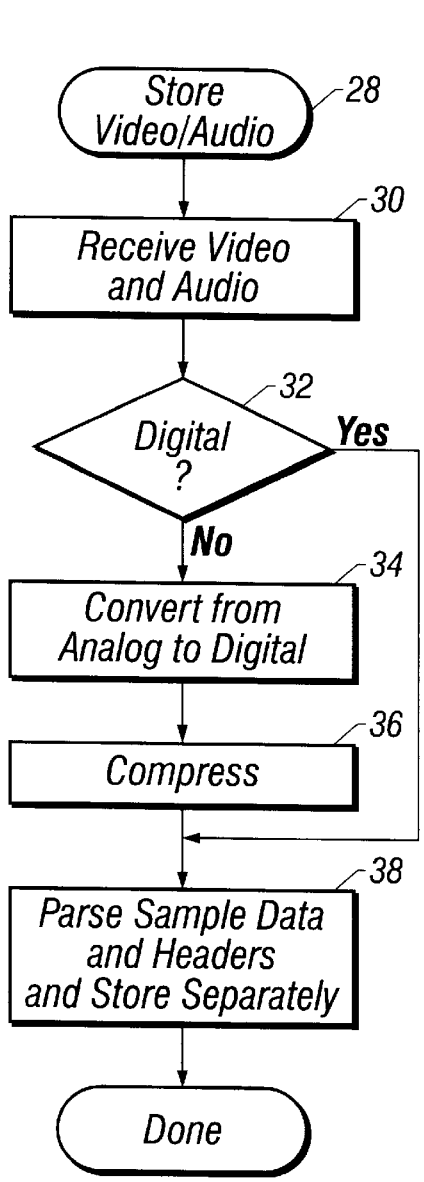
FIG. 3 is a flow chart showing one embodiment for software for storing the packet data in accordance with the present invention.

Generally, either analog or digital information is received as indicated in FIG. 3. For example, a transport medium may provide video and audio information for receipt at a receiving site as indicated in block 30. A check at diamond 32 determines whether the received information is in a digital format. If not, the information may be converted from analog to digital as indicated at block 34 and compressed as indicated in block 36. The digital information (as received or as converted) is parsed so that the packets are split into sample data and header data.

Packets are units of information that may be transmitted as a whole from one device to another. The packets include the sample data which in one embodiment may be audio and video data for a movie or a sporting event. The header commonly precedes the sample data in each packet and identifies the sample data. For example, the header may include information about the order that the packets are to be replayed. In some cases, the header may include a destination address and information about the packet length.

While the packets are parsed at the receiving site in the illustrated embodiment, other approaches may also be used. For example, the packet data may be parsed before it is received at the receiving site. Moreover, in some embodiments the packets may be formed at the receiving site with parsed or separated headers and sample data. For example, after decryption of a received file, the information may be packetized into packets including headers and sample data. The headers may provide the information needed to determine the order of the packets for replay.

The header is parsed from the sample data in the illustrated embodiment. However, in some embodiments only a part of either the header or the sample data may be parsed from the remainder of the packet. For example, information that links the header and the sample data may be parsed in one embodiment of the present invention.

The sample and header information may then be stored in separate memory locations at the receiving site. This has the advantage of making it more difficult for the receiving site user to make duplicate copies of the received information without paying adequate compensation to the content provider. The expectation is that the content provider will be more willing to transmit the information over the transport medium if the content provider can be assured that the information will not be duplicated (other than as permitted) at the receiving site.

Figure 1:
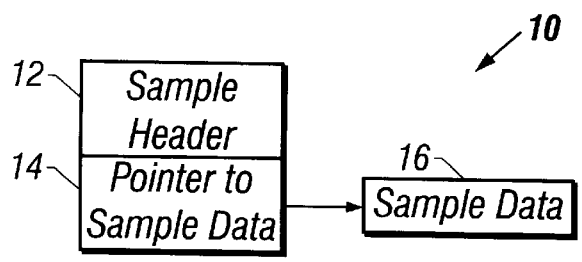
FIG. 1 is a schematic depiction of a sample to be stored.

Referring to FIG. 1, the digitized packets 10 may include a sample header 12 and a pointer 14 to sample data 16. In order to play back the information, the header is used to reconstruct the sample data. Thus, the pointer to the sample data links the header to the sample data. However, if the packet is stored with the header and the sample data together, it is easier for someone to make multiple copies of the packet at the receiving site.

To avoid the misuse of the received packets, the sample data and headers may be parsed as described and stored separately. In this way, the information can be played back a limited number of times. The link between the header and sample data or one of the header or sample data is completely or partially destroyed upon playback, thereby preventing restoration or making of unauthorized copies.

Figure 4:
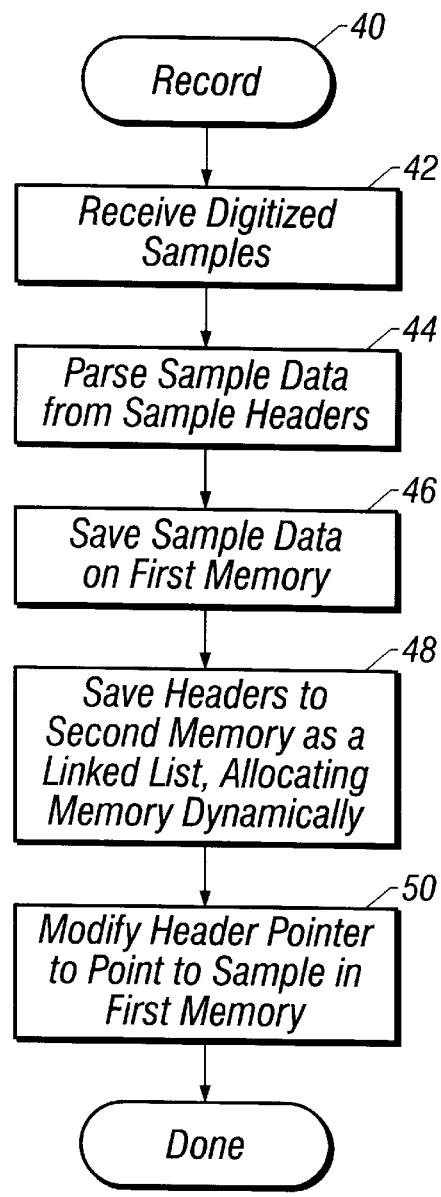
FIG. 4 is a flow chart of software for storing packet information in accordance with one embodiment of the present invention.

Referring to FIG. 4, a flow chart 40 for software that stores received packets involves initially receiving the digitized samples as indicated in block 42. As described previously, the sample data may be parsed from the sample headers, as indicated in block 44 in one embodiment of the invention. The sample data may then be stored on a first memory (block 46). In one embodiment of the present invention, the sample data may be stored on a hard disk drive. For example, the sample data may be stored in a dedicated partition in a hard disk drive. In some embodiments, it may be advantageous to avoid having a file system for the data on the drive. Instead, a dedicated partition may be used which is not under the control of the operating system. Thus, the partition is not seen by the operating system.

The header may then be saved to a second memory as a linked list, as indicated in block 48. By allocating the second memory dynamically, the header is randomly distributed around the second memory. Each time a header is stored, the operating system may request a memory location. The header is then stored and the storage address of that header is stored in association with another, previously stored header. In this way, a dynamic linked list is built which allows the flow to proceed from header to header, retrieving the sample data for each header. Thus, the headers may not be easily found by searching for patterns. This prevents using the stored information for making unauthorized copies.

The headers may be stored as a linked list on the second memory, linked to the information about the corresponding sample data on the first memory, such as a hard disk drive. This may be done, for example, by storing a hard disk drive offset with the headers. In embodiments where video and audio information is received, separate linked lists may be used for video and audio samples.

Figure 2:
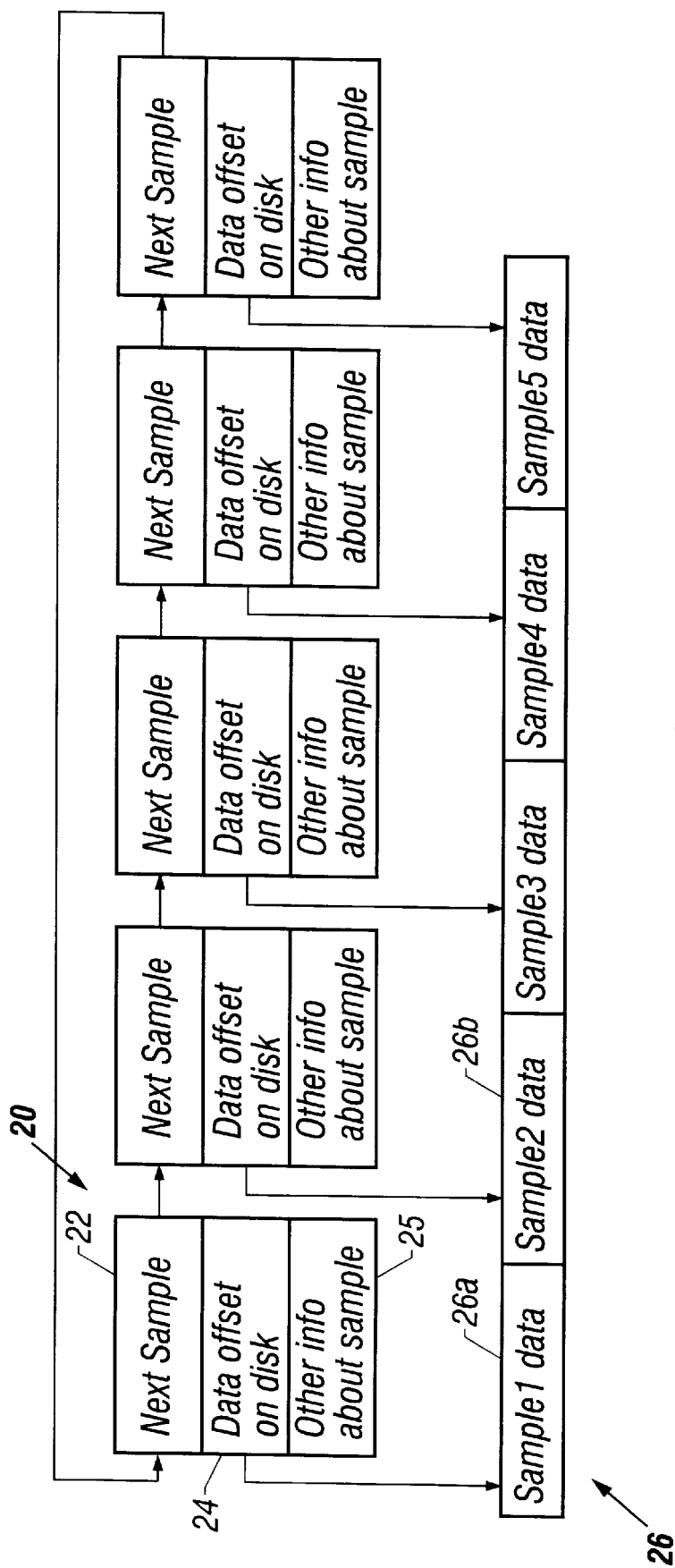
FIG. 2 is a schematic depiction of how the sample is stored in accordance with one aspect of the present invention.

As indicated in block 50, the header pointer shown in FIG. 1 is modified to point to a sample in the first memory which, in one embodiment of the present invention, may be a hard disk drive. Thus, referring to FIG. 2, each sample identifier 22 from a packet points to the sample identifier from a following packet. In addition, a data offset for the corresponding data 26 on the hard disk drive is also stored as indicated at 24. Other information about the sample data which may be used to recreate the sample data may be stored as indicated at 25. The sample data which corresponds to a given header 22 may be stored on the hard disk drive 26 at a location 26a or 26b, as indicated in FIG. 2.

Figure 5:
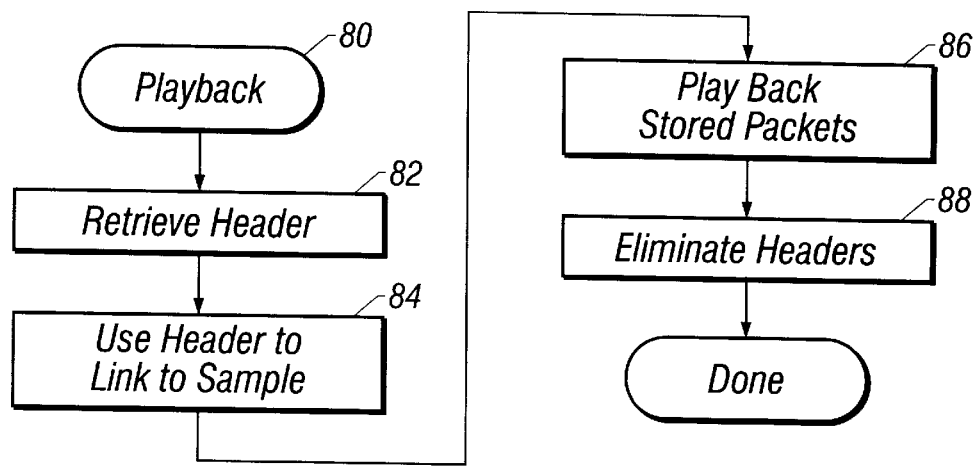
FIG. 5 is a flow chart of software for replaying stored information.

Referring to FIG. 5, after playing back the recorded sample data a predetermined time or times, the memory storing the headers may be released back to the memory pool and the headers are therefore destroyed. This means that once the sample data is viewed or played a predetermined number of times, it has been effectively eliminated from the receiving site.

When the play back feature is operated, for example, by selecting an appropriate icon on a user interface, the headers are successively retrieved as indicated in block 82. The header is used to link to the sample data as indicated in block 84. Stored packets are then successively played back as illustrated by block 86. As the packets are played back, the header stored, for example, in system memory may be destroyed as indicated in block 88. This prevents replaying of the stored sample data.

In some embodiments, the parsed information is stored on different memories. In other embodiments, it may be stored in different locations on the same memory, for example, in different partitions on the hard disk of a hard disk drive.

Figure 6:
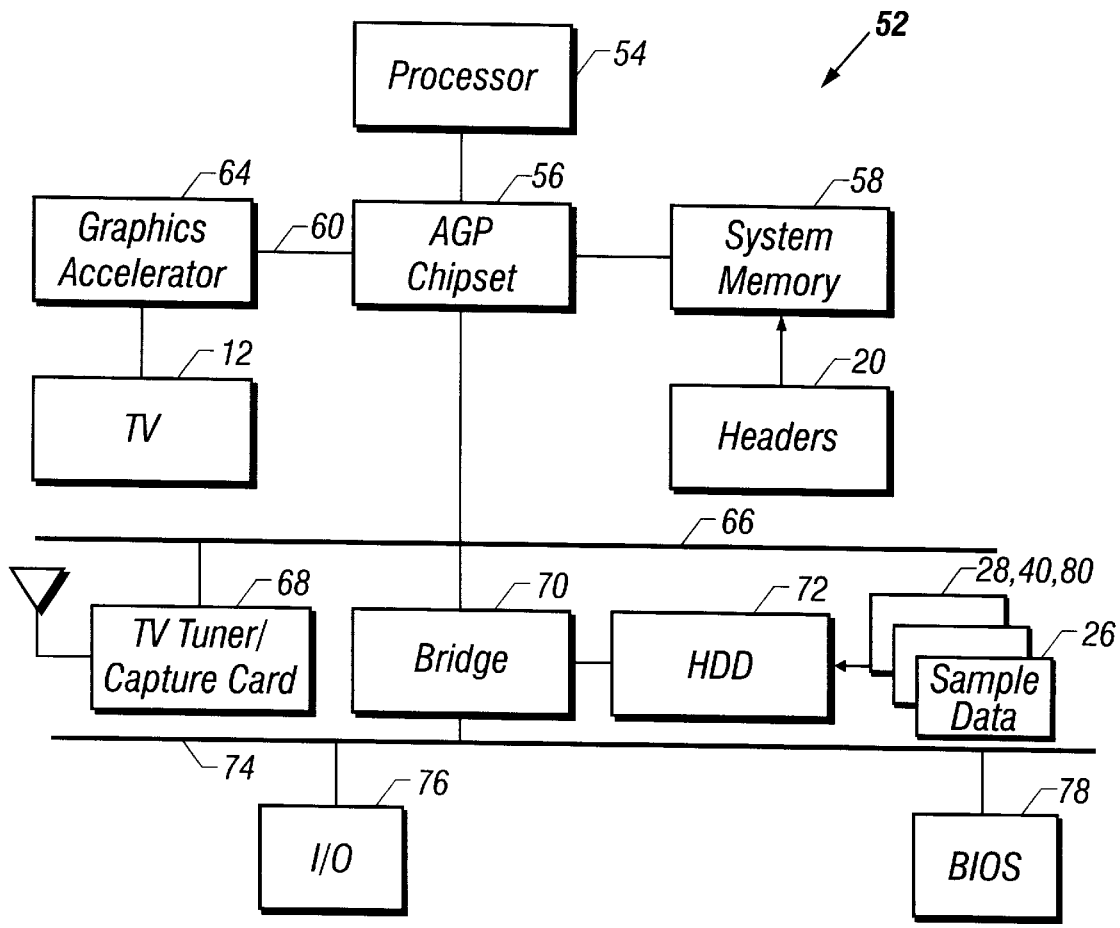
FIG. 6 is a block diagram showing one system for storing packet information in accordance with the present invention.

A system 52, in accordance with one embodiment of the invention, shown in FIG. 6, includes a processor 54. The processor 54 may be coupled to an accelerated graphics port (AGP) chipset 56 for implementing an accelerated graphics port embodiment. (See the Accelerated Graphics Port Specification, Rev. 2.0, available from Intel Corporation of Santa Clara, Calif.) The chipset 56 communicates with the AGP port 60 and the graphics accelerator 62. A television 64 may be coupled to the video output of the graphics accelerator 62. The chipset 56 may accommodate the system memory 58. The header 20 may be stored on the system memory 58.

The chipset 56 is also coupled to a bus 66 which may be, for example, a peripheral component interconnect (PCI) bus (PCI Local Bus Specification, Version 2.1, Jun. 1, 1995). The bus 66 couples to a TV tuner and capture card 68 which is coupled to an antenna or other video input port, such as a cable port, a satellite receiver/antenna or the like. The TV tuner and capture card 68 selects a desired television channel and also performs the video capture function. One example of a video capture card is the ISVR-III video capture card available from Intel Corporation.

The bus 66 is coupled to a bridge 70 which couples to a hard disk drive 72. The software 28, 40 and 80 may be stored on the hard disk drive 72 together with the sample data 26. The bridge 70 is also coupled to another bus 74. The bus 74 may be coupled to input/output (I/O) devices 76 and a basic input/output system (BIOS) 78. Of course the embodiment shown in FIG. 5 is merely one example of a system for implementing the present invention. Many other variations are contemplated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of storing packet information including a header and sample data comprising:

receiving at least a portion of the sample header and at least a portion of the sample data parsed from one another; and storing said portions of said header and sample data in different memory locations.

2. The method of claim 1 further including parsing and storing the sample header and data portions at the receiving site.

3. The method of claim 1 wherein storing includes storing said header and sample data portions in different memories.

4. The method of claim 1 further including receiving information, determining whether the information is in a digital format, and if not, converting the information from an analog to a digital format.

5. The method of claim 4 further including compressing said received information.

6. The method of claim 1 further including providing a link from said header to said sample data and from one header to another header.

7. The method of claim 6 further including storing said header in a first memory and said data in a second memory, and storing an offset to said data with said header in said first memory.

8. The method of claim 7 wherein storing said portions includes storing said data in a hard disk drive.

9. The method of claim 8 wherein storing said portions includes storing said data in a separate partition in said hard disk drive.

10. The method of claim 8 wherein storing said portions includes storing said header on system memory.

11. The method of claim 1 further including playing said stored packet information and deleting said header.

12. The method of claim 1 further including allocating the storage for said header dynamically.

13. The method of claim 1 further including providing a different linked list for audio and video samples.

14. An article comprising a medium for storing instructions that cause a processor-based system to:
- receive at least a portion of the sample header and at least a portion of the sample data parsed from one another; and
- store said portions of said header and sample data in different memory locations.

15. The article of claim 14 further storing instructions that cause a processor-based system to parse and store the sample header and data portions at the receiving site.

16. The article of claim 14 further storing instructions that cause a processor-based system to store said header and sample data portions in different memories.

17. The article of claim 14 further storing instructions that cause a processor-based system to receive information, determine whether the information is in a digital format, and if not, convert the information from an analog to a digital format.

18. The article of claim 17 further storing instructions that cause a processor-based system to compress said received data.

19. The article of claim 14 further storing instructions that cause a processor-based system to provide a link from said header to said sample data and from one header to another header.

20. The article of claim 19 further storing instructions that cause a processor-based system to store said header in a first memory and said data in a second memory, and store an offset to said data with said header in said first memory.

21. The article of claim 20 further storing instructions that cause a processor-based system to store said data in a hard disk drive.

22. The article of claim 21 further storing instructions that cause a processor-based system to store said data in a separate partition in said hard disk drive.

23. The article of claim 21 further storing instructions that cause a processor-based system to store said header on system memory.

24. The article of claim 14 further storing instructions that cause a processor-based system to play said stored packet information and delete said header.

25. The article of claim 14 further storing instructions that cause a processor-based system to allocate the storage for said header dynamically.

26. The article of claim 14 further storing instructions that cause a processor-based system to provide a different linked list for audio and video samples.

27. A system comprising:
- a processor;
- a first memory location coupled to said processor;
- a second memory location coupled to said processor; and
- packets including headers stored in said first memory location linked to sample data stored in said second memory location.

28. The system of claim 27 wherein said first memory is allocated dynamically.

29. The system of claim 27 wherein said headers are stored as a linked list.

30. The system of claim 27 including a system memory and a hard disk drive coupled to said processor wherein said first memory location is in said system memory and said second memory location is in said hard disk drive.

* * * * *